US012553838B2

(12) United States Patent
Conley et al.

(10) Patent No.: US 12,553,838 B2
(45) Date of Patent: Feb. 17, 2026

(54) HIGH RESOLUTION X-RAY REFLECTOMETER

(71) Applicant: UCHICAGO ARGONNE, LLC, Chicago, IL (US)

(72) Inventors: Raymond P. Conley, Glen Ellyn, IL (US); Kael Seaver, Chicago, IL (US); Deming Shu, Darien, IL (US); Scott J. Izzo, Standish, MI (US); Lahsen Assoufid, Chicago, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 182 days.

(21) Appl. No.: 18/478,868

(22) Filed: Sep. 29, 2023

(65) Prior Publication Data

US 2025/0110068 A1    Apr. 3, 2025

(51) Int. Cl.
   *G01N 23/20008* (2018.01)
(52) U.S. Cl.
   CPC . *G01N 23/20008* (2013.01); *G01N 2223/316* (2013.01); *G01N 2223/33* (2013.01)
(58) Field of Classification Search
   None
   See application file for complete search history.

(56) References Cited

U.S. PATENT DOCUMENTS

| | | | | | |
|---|---|---|---|---|---|
| 4,511,110 | A | * | 4/1985 | Moller | B66F 7/0658 248/421 |
| 5,966,423 | A | * | 10/1999 | Quinn | G01N 23/20025 378/81 |
| 6,151,116 | A | * | 11/2000 | Hirosawa | G01J 4/04 356/369 |
| 2003/0128809 | A1 | * | 7/2003 | Umezawa | H01L 22/12 378/70 |

* cited by examiner

*Primary Examiner* — Hoon K Song
(74) *Attorney, Agent, or Firm* — MARSHALL, GERSTEIN & BORUN LLP

(57) ABSTRACT

A high-resolution x-ray reflectometer system that is for characterization of mirrors for use with advanced light sources and includes a table, arc, and sample stage. The table and arc may be made of the same material, in some configurations that material is granite. An x-ray source and detector are mounted on the arc. The arc is movable along the surface of the table in a first direction, and the sample stage is moveable on the table surface in a second direction, perpendicular to the first direction. The sample stage can accommodate a sample with a thickness of 5 cm or more. Vertical lifting stages at each end of the sample stage allow for independent height adjustment of the ends, allowing for tiling of the sample. An autocollimator is mounted at the apex of the arc to characterize the tilt of a sample on the sample stage.

13 Claims, 11 Drawing Sheets

HIGH RESOLUTION X-RAY REFLECTOMETER

STATEMENT REGARDING FEDERALLY SPONSORED RESEARCH OR DEVELOPMENT

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE DISCLOSURE

The present disclosure relates to high-resolution x-ray reflectometers, specifically a high-resolution x-ray reflectometer with improved collimation, spectral purity, and mechanical stability.

BACKGROUND

Mirrors and lenses are important components in optical systems, including light sources that produce extreme-brightness x-rays. The mirrors used in these advanced light sources may be a metal deposited on a substrate, such as platinum on silicon; a multi-layer mirror with materials of different properties; or adaptive/active mirrors. Adaptive/active mirrors use zones of piezoelectric materials on the surface of a mirror to create spatially localized deformations of the optical surface when a current is applied to a specific zone. Because of the electronics needed in adaptive mirrors to locally actuate piezoelectric zones, these mirrors are large assemblies with a thickness between 10 and 15 cm, a length between 50 and 100 cm, and a width between 10 and 15 cm. No matter what type of mirror is used, the quality of the mirror may negatively affect characteristics of the x-ray beam produced by an advanced light source, in turn potentially limiting the quality of the data obtained using the x-ray beam.

In order to achieve x-ray beams of desired brightness and spot size, mirrors of suitable quality in terms of materials properties and surface properties are needed. The ability to characterize mirrors prior to installation is desirable. Non-destructive characterization of the mirrors is preferred. However, in systems which are large in physical scale, the mirrors will be correspondingly large. X-ray reflectivity measurements are ideal for non-destructive characterization of thin films, as x-ray reflectivity measurement data can be used to derive film thickness, surface or interfacial smoothness, and density of the material. Conventional apparatuses used to perform x-ray reflectivity measurements (e.g., x-ray reflectometers) may accommodate samples such as coated wafers or chips, which usually have a thickness on the order of millimeters, and the stage holding the sample may be configured for adjustment only on the order of centimeters. For x-ray reflectivity measurements, it is also necessary to be able to tilt the sample, and in turn, the sample stage must be able to securely hold the sample even when tilted. Accordingly, there is a need for improved x-ray reflectometers which can evaluate optical mirrors of various configurations, including conventional multilayer mirrors and adaptive mirrors, for minute flaws and imperfections.

SUMMARY OF THE DISCLOSURE

In accordance with a first aspect, a high-resolution x-ray reflectometer is provided. The high-resolution reflectometer includes a table, an x-ray source assembly and an x-ray detector assembly mounted on an arc, and a sample stage positioned under the arc on a top surface of the table. The arc configured to move relative to the top surface of the table in a first direction, and the sample stage is configured to move relative to the top surface of the table in a second direction. The x-ray source assembly and the detector assembly are configured to move in a third direction relative to the sample stage, in which the third direction is different from the first direction.

In further accordance with the first aspect, the high-resolution x-ray reflectometer may further include any one or more of the following preferred forms.

In some forms, the sample stage includes a tray with a first end and a second end and a first vertical lifting stage configured to move the first end of the tray, and in which the tray is configured to accommodate a sample with a thickness of 10 cm or more, and wherein the first end operably attached to a the first vertical lifting stage via a first pair of legs, each leg having a first bearing connecting the tray to the leg and a second bearing connecting the leg having a first bearing connecting the tray to the leg and a second bearing connecting the leg to the first vertical lifting stage.

In some forms, the sample stage further includes a second vertical lifting stage configured to move the second end of the tray, and in which the second end is operably attached to the second vertical lifting stage via a second pair of legs, in which each leg of the second pair of legs comprises a single bearing connecting the leg to either the tray or the second vertical lifting stage.

In some forms, the sample stage includes a tray having a first end and a second end, a first vertical lifting stage configured to move the first end, and a second vertical lifting stage configured to move the second end.

In some forms, the first vertical lifting stage and the second vertical lifting stage are independently controllable such the first and second vertical lifting stages are configured to raise the first and second end of the tray independently.

In some forms, the sample stage is configured to tilt the tray.

In some forms, the high-resolution x-ray reflectometer also includes a two-dimensional (2D) angle detector, such as an autocollimator, mounted on the arc, and the angle detector or autocollimator is configured to determine the tilt of a sample on the sample stage.

In some forms, the x-ray source assembly includes an x-ray source, a monochromator, a first slit, and a second slit, with the first slit being positioned between an x-ray source within the x-ray source assembly and the monochromator, and the second slit is positioned along the downstream x-ray path from the monochromator (e.g., on the other side of the monochromator).

In some forms, the first slit and the second slit each have openings which are controlled by dedicated actuators, such that the first slit and the second slit are independently controllable.

In accordance with a second aspect, a sample stage for a high-resolution reflectometer is provided. The sample stage includes a tray with a first end and a second end, a first and a second vertical lifting stage, a first pair of legs operably attached to the first end of the tray and the first vertical lifting stage, such that the first vertical lifting stage is configured to move the first end of the tray, and a second pair of legs operably attached to the second end of the tray and the second vertical lifting stage, such that the second vertical lifting stage is configured to move the second end of the tray.

Each leg of the first pair of legs has a first bearing connecting the tray to the leg and a second bearing connecting the leg to the first vertical lifting stage of the sample stage, wherein the sample stage is configured to accommodate a sample with a thickness of 10 cm or more.

In further accordance with the second aspect, a sample stage for a high-resolution reflectometer may further include any one or more of the following preferred forms.

In some forms, each leg of the second pair of legs includes a single bearing connecting the leg to either the tray or the second vertical lifting stage.

In some forms, each leg of the second pair of legs includes the single bearing that connects the leg to the tray.

In some forms, the first vertical lifting stage and second vertical lifting stage are configured to raise the first and second end of the tray independently.

In some forms, the sample stage is configured to tilt the tray.

In accordance with a third aspect, a high-resolution reflectometry system comprising a processor and a non-volatile computer readable medium storing instructions that when executed by a processor cause the system to: produce an x-ray beam using an x-ray source assembly; impinge the x-ray beam onto the sample; tilt a sample on a sample stage until the x-ray beam reflects; receive, by a detector assembly, the reflected x-ray beam; and an optimize the tilt of the stage based on data obtained by an autocollimator of the x-ray reflectometry system. The sample stage includes: a tray with a first end and a second end; a first vertical lifting stage; a second vertical lifting stage; and a first pair of legs operably attached to the first end of the tray and the first vertical lifting stage such that the first vertical lifting stage is configured to move the first end of the tray; and a second pair of legs operably attaching the second end of the tray and the second vertical lifting stage, such that the second vertical lifting stage is configured to move the second end of the tray.

In further accordance with the third aspect, a sample stage for a high-resolution reflectometer may further include any one or more of the following preferred forms.

In some forms, the instructions further cause the system to accept instructions from an operator, the instructions from the operator including any of: an adjustment of a height of the first vertical lifting stage based on data obtained by the autocollimator; an adjustment of a height of the second vertical lifting stage based on data obtained by the autocollimator; insertion of a monochromator into the x-ray beam path as it leaves the x-ray source; removal of the monochromator from the x-ray beam path from the x-ray source; and an adjustment to a position or size of one or more slits along the x-ray beam path.

In some forms, the instructions further cause the system to display data to the operator.

In some forms, the instructions further cause the system to translate an arc of the reflectometry system in a z direction of the system.

In some forms, instructions further cause the system to translate of the sample stage in an x direction of the system.

In some forms, instructions further include adjustment of a rate of movement of the x-ray source assembly and of the detector assembly.

In some forms, the autocollimator is an electronic autocollimator.

BRIEF DESCRIPTION OF THE DRAWINGS

The Figures described below depict various aspects of the system and methods disclosed therein. It should be understood that each figure depicts an example of a particular aspect of the disclosed system and methods, and that each of the figures is intended to accord with a possible example thereof. Further, wherever possible, the following description refers to the reference numerals included in the following figures, in which features depicted in multiple figures are designated with consistent reference numerals.

There are shown in the drawing arrangements which are presently discussed, it being understood, however, that the present embodiments are not limited to the precise arrangements and instrumentalities shown, wherein.

DETAILED DESCRIPTION

The present disclosure is directed to an x-ray reflectometer that aims to address the above-discussed problems with known x-ray reflectometers as well as other problems. The x-ray reflectometer disclosed herein provides system stability, accommodation of large samples, and high-resolution in terms of x-ray beam quality and incident angle. X-ray reflectance data is intensity as a function of incident angle of the x-ray beam ($\theta$). Because of this, in order to obtain high-resolution data, the x-ray reflectometer must be able to resolve fractions of a degree as well as small, discrete areas on a sample surface.

Figure 1:
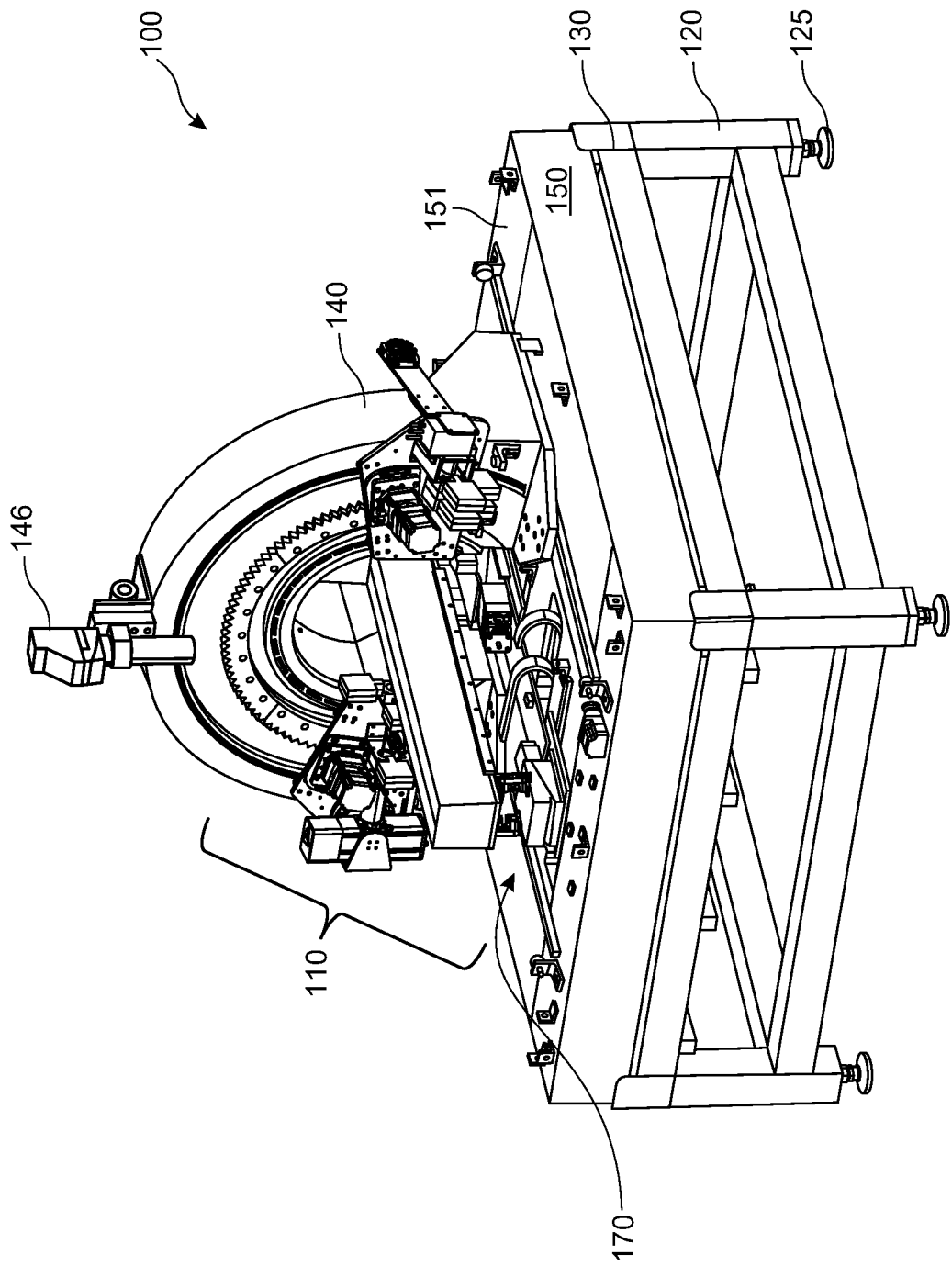
FIG. 1 is a perspective view of an exemplary embodiment of an x-ray reflectometer, in accordance with the present disclosure.

Turning to the Figures, FIG. 1 is a perspective view of an exemplary embodiment of a high-resolution x-ray reflectometer system 100. The high-resolution x-ray reflectometry system 100 generally includes an x-ray reflectometer 110 and a safely shield assembly 115 (shown in outline) removably coupled to the x-ray reflectometer 110 to house (and protect) some of the components of the x-ray reflectometer 110. The x-ray reflectometer 110 has for its base a metal frame 120 with adjustable/leveling feet 125, a tabletop slab 150, a fitting to hold the granite table top 150 on and within the frame 120, an arc 140 which sits atop the tabletop slab 150, a sample holder 170 (e.g., a mirror stage), and an electronic autocollimator 146. The electric autocollimator 146 is situated at the apex of the arc 140 of the x-ray reflectometry system. The sample holder 170 (mirror stage) is situated under the arc 140 so that the electronic autocollimator 146 may determine the amount of tilt of the sample by directing a beam of light on the sample and detecting a beam of light reflected onto an electronic photodetector. The angle between the beam leaving the electronic autocollimator and the reflected light beam is correlated to the amount of tilt of a surface, in FIG. 1, the amount of tilt in the sample on the sample holder 170.

Figure 2:
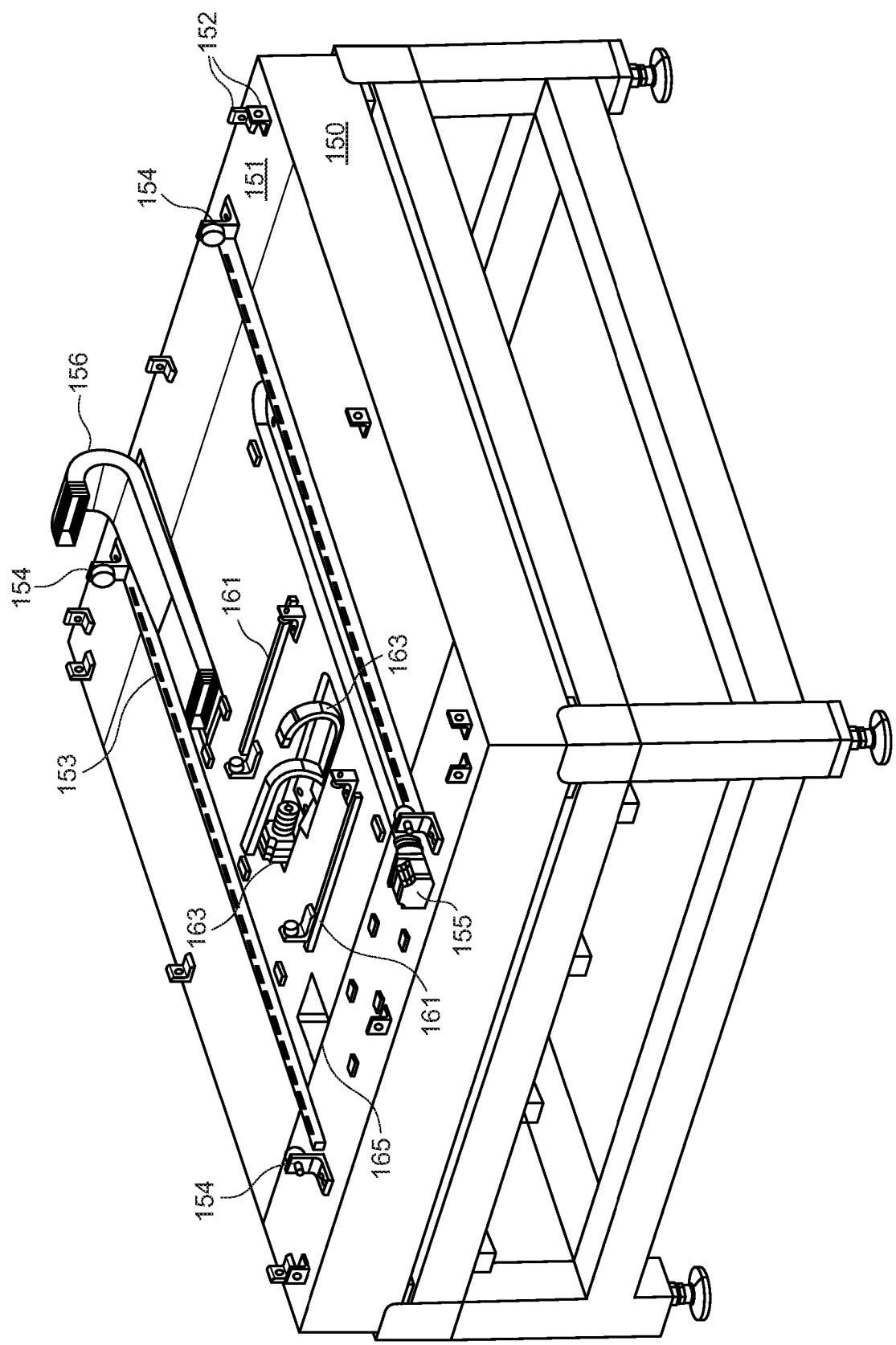
FIG. 2 is a perspective view of the table of the x-ray reflectometer, in accordance with the embodiment shown in FIG. 1.

The tabletop slab 150 is shown in FIG. 2 with fittings on its top surface 151. These fittings include fittings to attach safety shielding screens 152, rails 153 for facilitating translation of the arc 140 in the z direction, translation stops 154 that limit translation of the arc 140 in the z-direction, a stepper motor 155 for translating the arc 140, plastic flex cable-management device 156, and fittings 160 for facilitating translation of the sample holder 170. The fittings 160 include rails for facilitating translation 161 of the sample holder 170 in the x direction and a stepper motor 163 for translating the sample holder 170. More fittings may be added to the tabletop slab 150 as needed. The fittings may be made of stainless steel or another sufficiently robust material. In the embodiment shown in FIG. 1, the fittings are made of stainless steel and secured to the tabletop slab 150 via screws or other similar fittings and epoxy. The tabletop slab 150 also includes an opening 165 for cables and may include other components such as inserts, guides, screws, motors, and bumpers.

The tabletop slab 150 is preferably made of granite with finished surfaces of a reasonable smoothness and uniformity, such as, for example, laboratory Grade "A", or better granite, as defined per ASME B89.3.7-2013 Granite Surface Plates 1.2 Classification: Styles and Grades. In areas where the translation fittings (e.g., rails or slides) are attached to the tabletop slab 150, the surface 151 is polished to a higher finish to ensure movement without jerks or hesitations, for example so that the surface has a flatness of 5 microns (µm) or less, such as 3 microns or less. The arc 140 is also preferably made of granite. However, another stable and dense material, such as marble, may be used to fabricate the tabletop slab 150 and/or the arc 140.

Figure 3:
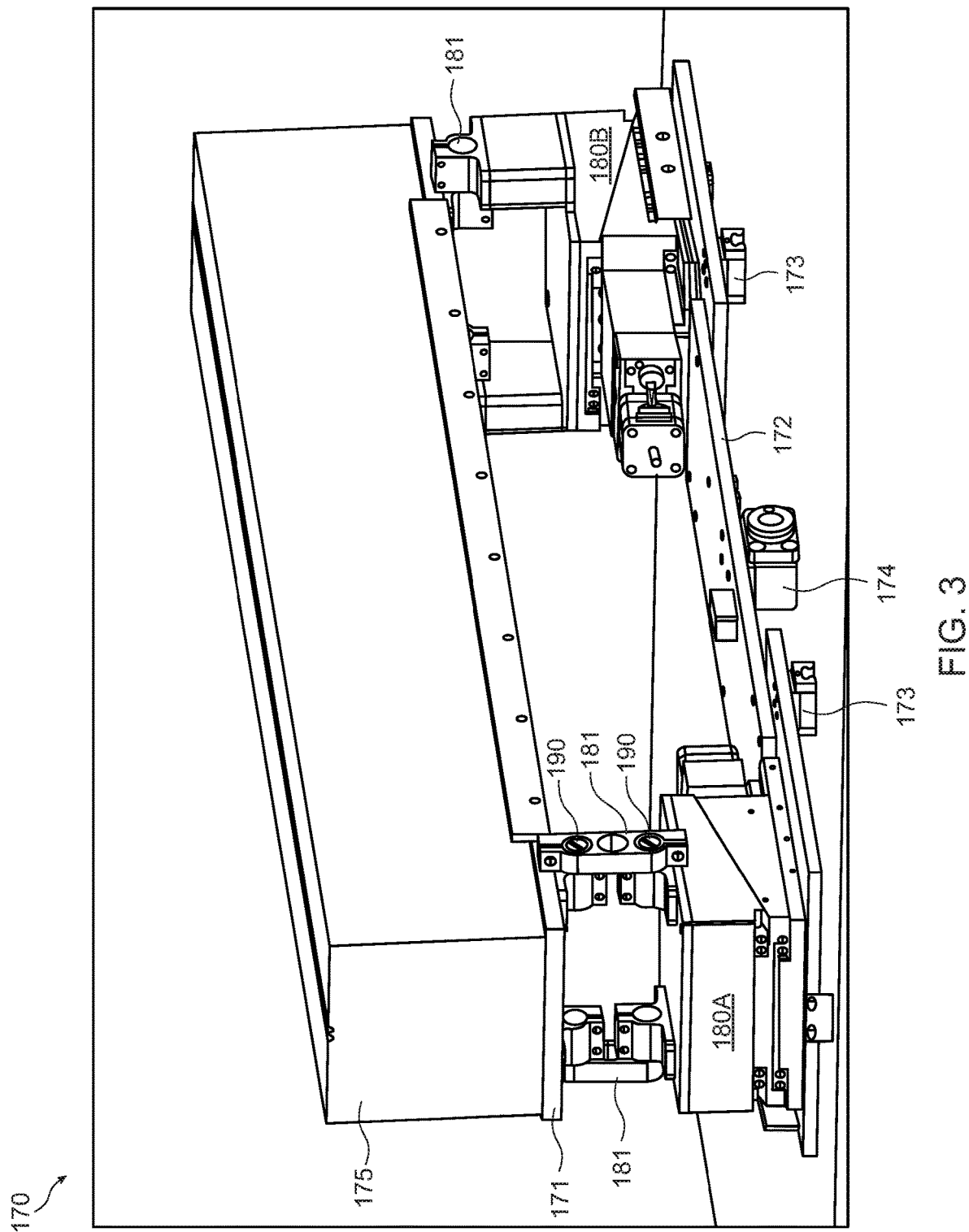
FIG. 3 is a perspective view of the mirror stage with an adaptive mirror placed as a sample to be characterized, in accordance with the embodiment shown in FIG. 1.
Figure 4:
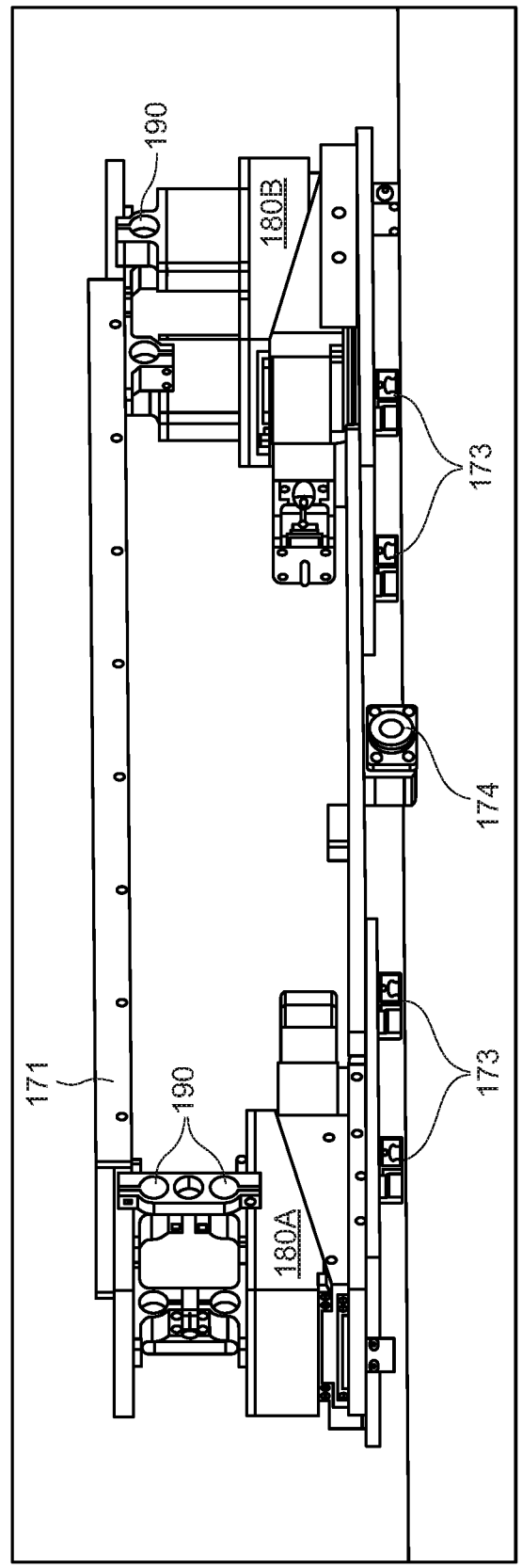
FIG. 4 is a plan view of the mirror stage shown in FIG. 3 but with the adaptive mirror removed from the mirror stage.

FIG. 3 shows a perspective view of the sample stage 170 with an adaptive mirror 175 placed as a sample for characterization by the x-ray reflectometer 110. FIG. 4 shows the sample stage 170 without the adaptive mirror 175, and it will be appreciated that other sample surfaces (e.g., mirrors, multilayers, adaptive mirrors, crystal optics) can be characterized by the x-ray reflectometer 110. As shown in FIG. 3 and FIG. 4, the sample stage 170 (which may also be referred to herein as the mirror stage 170) is sized to hold the adaptive mirror 175 without contacting the upper surface of the mirror 175. The mirror stage 170 shown in FIG. 3 has a top level 171 with sides arranged to secure the mirror 175 on the stage. This top level 171 may also be referred to as a mirror tray and is shown in FIG. 3 as having a rectangular footprint. Below the mirror tray 171, at each extremity of the mirror stage 170 is a vertical lifting stage 180A, 180B. Each vertical lifting stage 180A, 180B is connected to the mirror tray 171 via tray legs 181 and bearings 190. Two sets of bearings 190 connect the lifting stage 180A and a first end of the mirror tray 171, one set for each leg 181 and each leg having one bearing 190 more proximate to the mirror tray 171 and one bearing 190 more proximate to the lifting stage 180A. Meanwhile, two bearings 190 connect the lifting stage 180B and a second end of the mirror tray 171. Each of the tray legs 181 above the second lifting stage 180B has a single bearing. The mirror stage 170 also includes a base plate or bridge 172 that extends between the first lifting stage 180A and the second lifting stage 180B.

Referring again to FIG. 3 and FIG. 4, under the base plate 172 is a set of rail fittings (e.g., linear guides) 173 and a fitting 174 (e.g., a ball screw nut) for a stepper motor (not shown). The fitting 174 and the rail fittings 173, in conjunction with the stepper motor, facilitate movement of the mirror stage 170 in the x direction, that is, the direction perpendicular to the length of the mirror stage 170, across the surface 151 of the tabletop slab 150. In addition to having the ability to move the sample (e.g., the mirror 175) that is being characterized in the x direction, the mirror stage 170 is configured to tilt the sample as needed to align the sample (e.g., the mirror) in the x-ray reflectometer 110 for characterization.

To tilt the sample 175 seated in the top level 171 of the stage 170, one or both of the vertical lifting stages 180A, 180B may be actuated to lift one end of the sample relative to the other. The bearings 190 and the legs 181 allow for continuous movements through various positions during sample alignment or any other time when repositioning of the sample (e.g., mirror) in the y direction is needed, with the y direction being along the height of the x-ray reflectometer 110.

Figure 5:
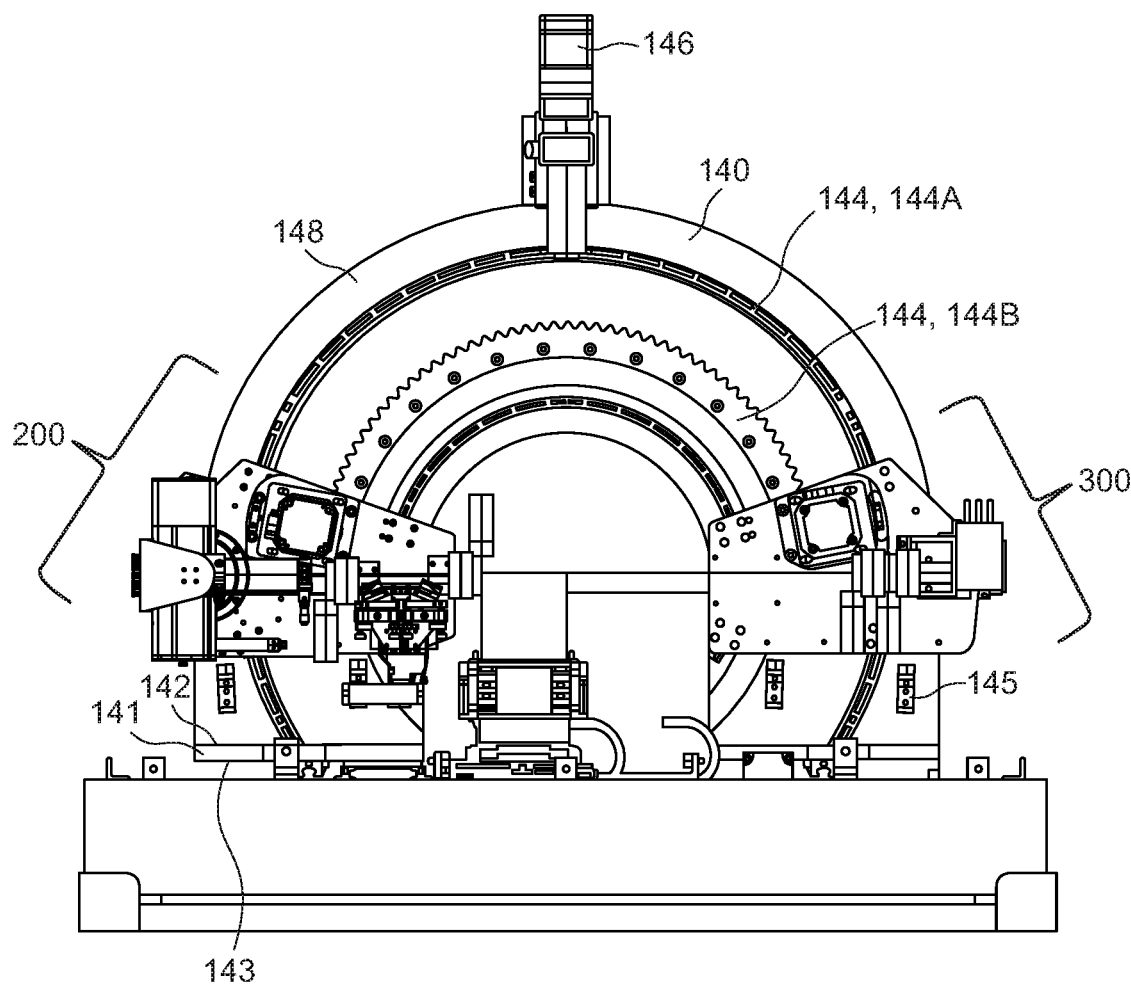
FIG. 5 shows an arc with a source assembly and a detector assembly, in accordance with the embodiment shown in FIG. 1.

FIG. 5 shows the arc 140 with a source assembly 200 and a detector assembly 300 atop the tabletop slab 150. The arc 140 shown has base fittings 141, each with a top surface 142 and a bottom surface 143, rails 144 including a guide rail 144a, a toothed rail 144b, stoppers 145, and the electronic autocollimation 146.

The source assembly 200 and the detector assembly 300 move along the arc through the actuation of separate stepper motors, at least one for each assembly. These assemblies 200, 300 move along the rails 144a, 144b (with 144b being a rack for a roller pinion system) on a face 148 of the arc 140. The rails 144a, 144b are in a x-y plane, such that the assemblies move in the x-y plane. The surface of the face 148 of arc 140 may have the same finish as that of the tabletop slab 150, that is, a surface that conforms to ASME B89.3.7-2013 Granite Surface Plates 1.2 Classification: Styles and Grades. The surface of the face 148 of the arc 140 may appear to be reasonably flat to the naked eye, and the areas under the rails 144a, 144b for translation of the source and detector assemblies 200, 300 are polished to a flatness of 5 microns (µm) or less, such as 3 microns or less.

Figure 6:
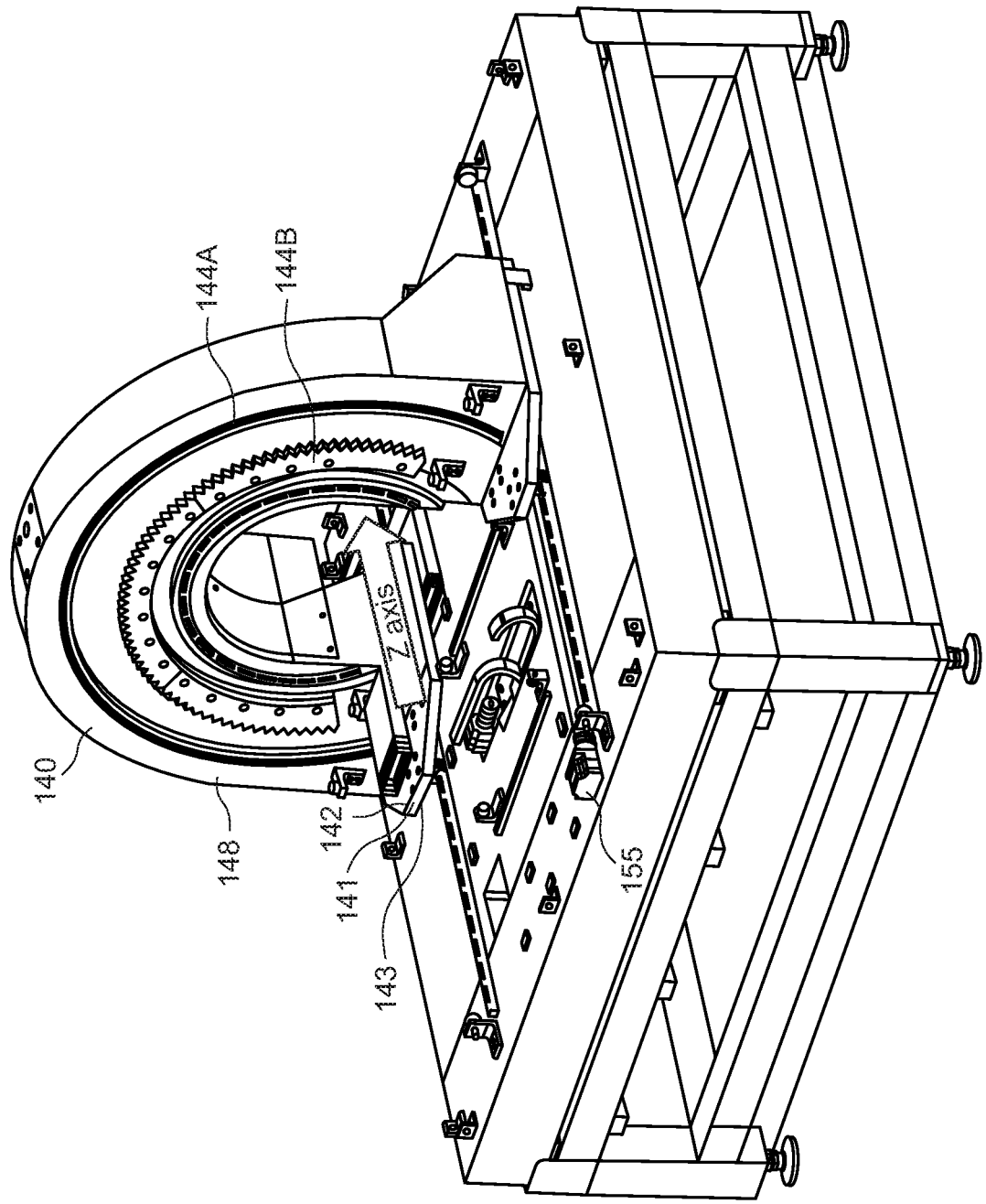
FIG. 6 shows the arc of FIG. 5 mounted on the table of FIG. 2 with the source assembly and the detector assembly removed.

FIG. 6 is a view of the arc 140 without the source and detector assemblies 200, 300, as well as without the autocollimator 146. The arc 140, in conjunction with the tabletop slab 150, is configured to allow for scanning across the length of the sample stage 170, i.e., in the z direction. The base fittings 141 on the arc 140 have fittings on a top side 142 to connect to the arc 140. These base fittings 141 have linear guides on a bottom side 143 which mate with the rails 153 on the top surface 151 of the tabletop slab 150 (see FIG. 1). When actuated, a stepper motor 155 translates the arc 140 along the rails 153 in the z direction.

Figure 7:
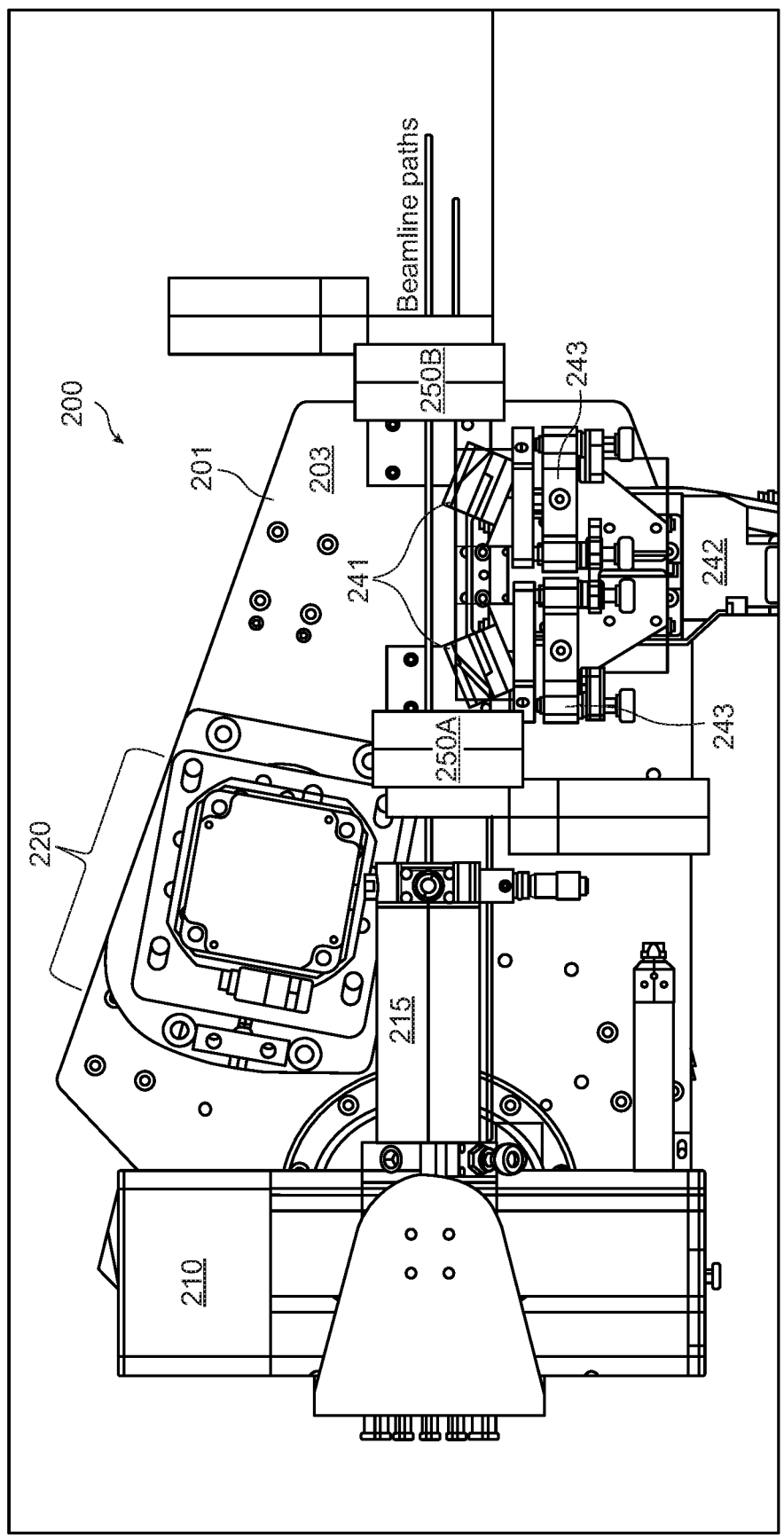
FIG. 7 shows an x-ray source assembly, in accordance with the embodiment shown in FIG. 1.

FIG. 7 shows the x-ray source assembly 200 in greater detail. The x-ray source assembly 200 includes a base plate 201, with an outward face 203, and a side 202 which is oriented toward the face 148 of the arc 140. On the outward face 203 there is an x-ray source 210, a cross-roller bearing 211, an actuator 212 for the bearing 211, a focus mirror 215, a pair of slits 250A, 250B, a monochromator assembly 240, and an assembly 220 for x-ray source motion along the arc 140. The assembly 220, which facilitates the motion of the x-ray source 220 along the arc 140 may include any of a pinion, a gearhead, a brake, and a stepper motor. The cross-roller bearing 211 allows for tilt in the x-ray source 210, and the actuator 212 is configured for driving the bearing 211 to tilt the source 210. The monochromator assembly 240 includes a pair of crystals 241 (e.g., Ge 220 crystals), a linear translator 242 to selectively remove and insert the monochromator assembly 240 from/into the x-ray beam path, and tip/tilt controls 243 for the crystals. The slits 250 are generally independently moveable relative to one another by dedicated actuators. The slits 250 include a slit 250A upstream of the monochromator assembly 240 which is situated between the source 210 and the monochromator crystals 250. There is also a slit 250B downstream of the monochromator assembly 240 which is situated after the crystals 250. Movement of each slit 250A, 250B by the respective dedicated actuator may change the opening size.

Figure 8:
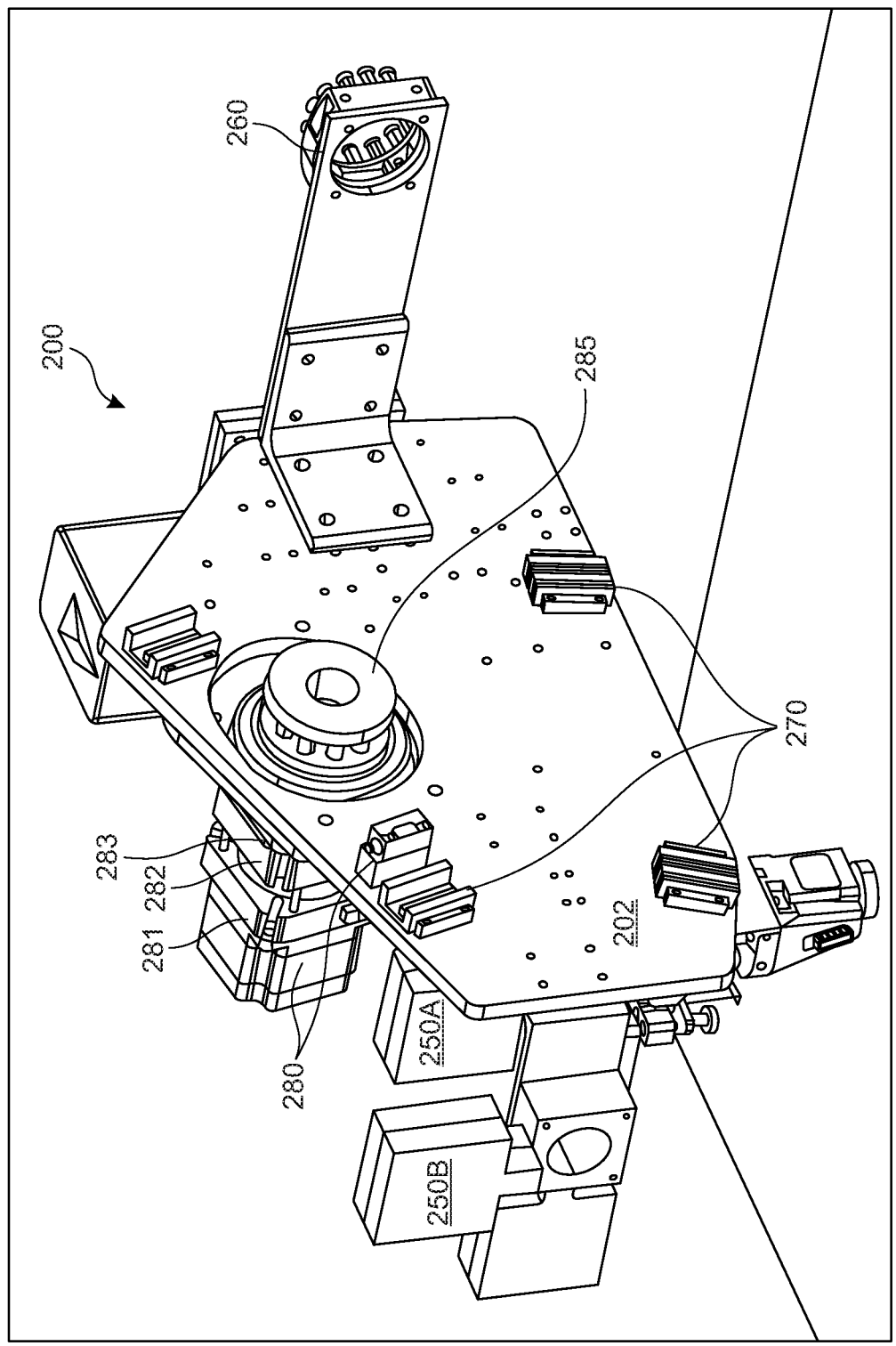
FIG. 8 is a rear perspective view of the source assembly showing the side of the assembly that interfaces with the arc, in accordance with the embodiment of FIG. 1.

FIG. 8 is a perspective view of the source assembly 200 showing the side 202 of the assembly 200 that interfaces with the face 148 of the arc 140. More particularly, FIG. 8 illustrates the components of the assembly 200 which are more concerned with the positioning of the source assembly 200 along the arc 140 as the source assembly 200 rotates, θ, about the stage 170. These components include a cable mount 260, arc guides 270, an optical encoder, a servo, a safety brake, a harmonic gear drive 283, and a roller pinion 285.

Figure 9:
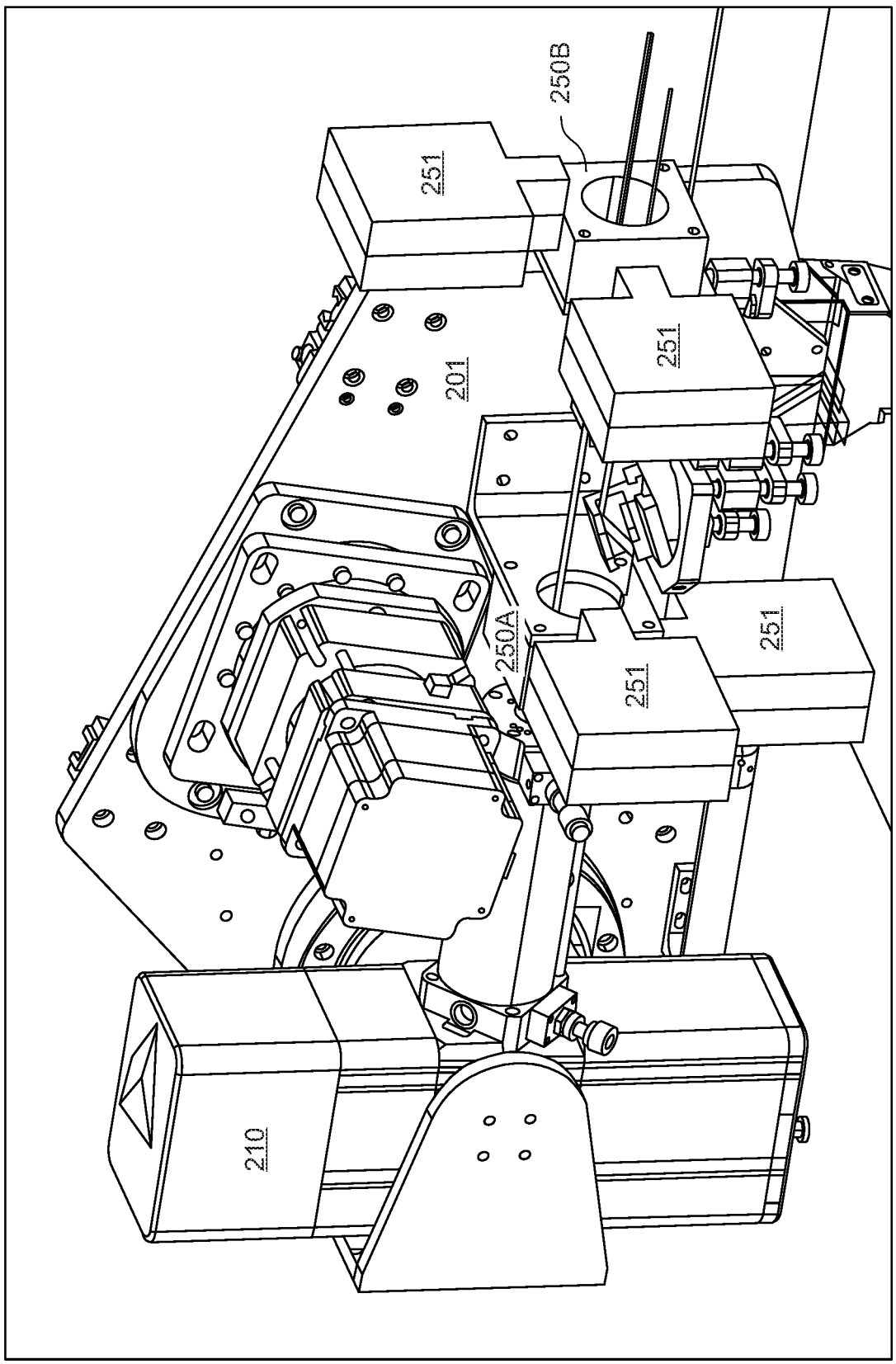
FIG. 9 is a front perspective view of the source assembly, showing the monochromator assembly and the slits of the monochromator assembly.

FIG. 9 is a perspective view of the source assembly 200 with a closer view of the monochromator assembly 240 and the slits 250A, 250B of the assembly 200, including the motors for the slits 250A, 250B to change the aperture created by the slits 250A, 250B. As indicated above, the slits 250A, 250B each have dedicated actuators 251 so that the openings created by the slits 250A, 250B may be controlled independently of each other.

Figure 10:
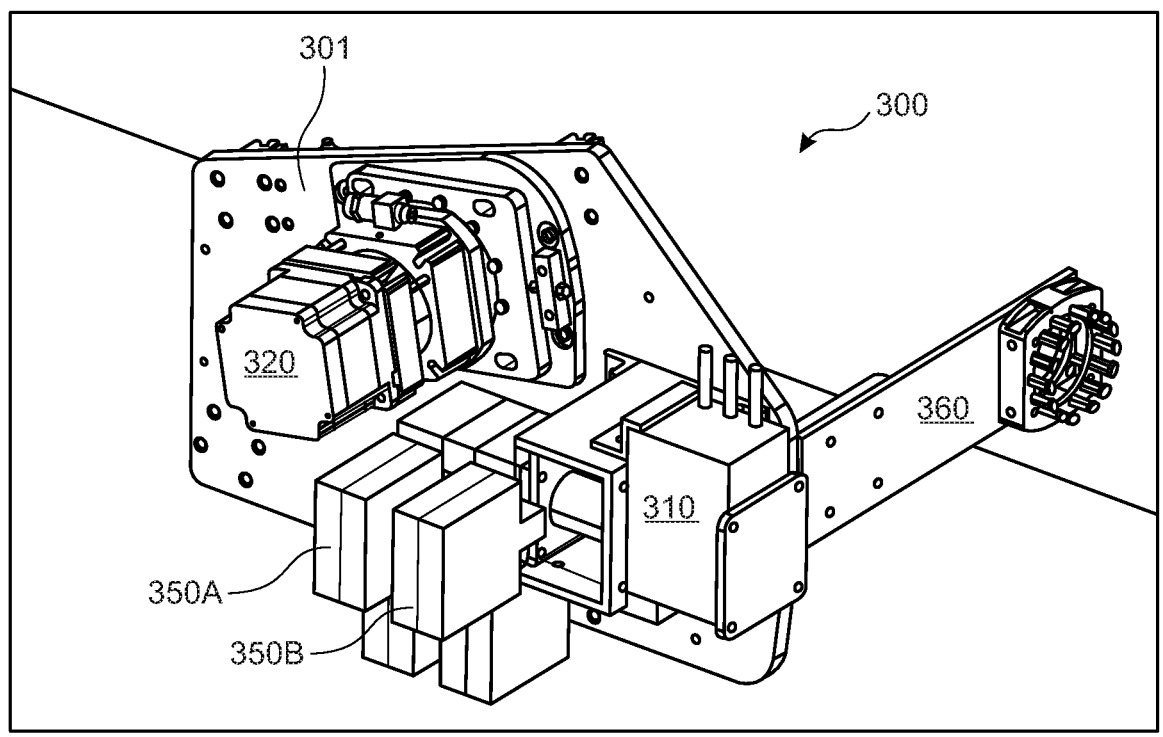
FIG. 10 is a perspective view of the detector assembly, in accordance with the embodiment shown in FIG. 1.
Figure 11:
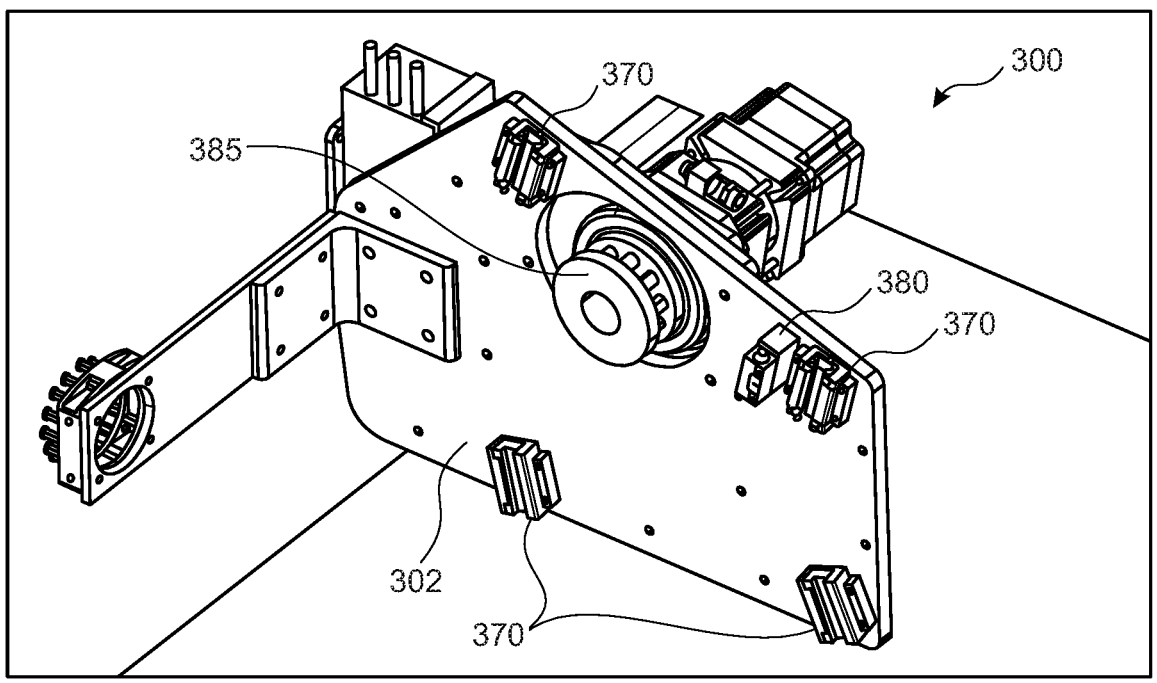
FIG. 11 is a perspective view of the detector assembly showing the side of the assembly that interfaces with the arc in accordance with the embodiment of FIG. 1.

FIG. 10 is a perspective view of the detector assembly 300 and FIG. 11 is a perspective view of the detector assembly 300 showing the side of the assembly 300 that interfaces with the arc 140. The detector assembly 300 includes a detector 310, slits 350A, 350B, and components which control the position and movement of the assembly 300 across the arc 140. These components which are involved in the movement of the assembly include, for example, a stepper motor 320, a safety brake 325, arc guides 370, an optical encoder 380, and a pinion 385. Like the slits 250A, 250B, the slits 350A, 350B each have dedicated actuators so that the openings created by the slits 350A, 350B may be controlled independently.

The configuration of the arc 140, the source assembly 200, and the detector assembly 300, with the rails and pinions described herein allow for backlash-free movement of the source assembly 200 and detector assembly 300 along the arc 140. Some conventional systems utilize arms for supporting and movement of the source and detector assemblies, and such arms may be subject to vibration or backlash as the source and detector assemblies of the system increment in the theta direction. The precision of systems utilizing arms, as opposed to the arc 140 of the system described herein, may be inferior due to the backlash and vibration of the source or detector at the end of an arm.

While not illustrated herein, the x-ray reflectometer system 100 may include one or more computing units for controlling the x-ray source assembly 200, the translation motors attached to the arc and the sample stage 170, the height motors associated with the sample stage, the motors which move the source assembly 200 and the detector assembly 300 along the arc 140, the motion of the monochromator assembly 240, the size of the slits 250A, 250B, 350A, 350B on both the source and detector assemblies, as well as computing units for data acquisition and analysis attached to the electronic autocollimator 146 and the detector assembly 300. It should be appreciated, however, that the system 100 is merely an example and that alternative or additional components are envisioned.

As indicated above, the z direction in the system 100 is along the length of the sample stage 170 (e.g., mirror stage), and thus along the length of the sample being characterized (in this case adaptive mirror 175). The x direction is perpendicular to the z direction and is along the width of the sample stage 170. The y direction is perpendicular to both the z direction and the x direction and is along the height of the system 100.

In another exemplary embodiment of a high-resolution x-ray reflectometry system 200 similar to the system 100 described above, the system 100 is configured to characterize an adaptive mirror that includes a mirror portion of a metal thin film on a semiconductor flanked by piezoelectric zones which can locally deform the mirror. In such a system, the reflectometry system includes a table with a stainless steel frame and a granite top (similar to the slab 150). The granite top is 1750 mm long (in the z direction), 1300 mm wide (in the x direction), and 200 mm thick (in the y direction). The granite top has a mass of 1414 kg. This mass gives the overall system stability as compared to an experimental set-up that includes an optics table with a breadboard plate. Such experimental set-ups may be made of aluminum, which weighs much less than the granite top of this exemplary high-resolution x-ray reflectometry system 100.

Positioned on top of the granite table top is an arc (similar to the arc 140), also made of granite, which supports an x-ray beam source assembly (similar to the source assembly 200) and a detector assembly (similar to the detector assembly 300). The arc is oriented in the y direction, so that 0 degrees is parallel to the granite table top, and 90 degrees is at the apex of the arc and perpendicular to the granite table top. The length of the arc, that is to say the ends of the arc, are aligned along the x direction. In the system, the arc is configured to move along the top of the granite table in the z direction, that is along the length of the table. The x-ray source assembly and the detector assembly are configured to move along the arc, incrementing in degrees above and below a plane parallel to that of the table top (θ (theta) rotation). The stepper motors on the x-ray source and detector assemblies preferably allow for a range of motion of −2° to 70° with a resolution of 0.001° for a full step (0.0005° for a half step), and positioning accuracy of 0.00035°.

Located under the arc, on the granite table top, is a mirror stage similar to the mirror stage 170. The mirror stage is configured to orient the adaptive mirror with its longest dimension along the z direction of the system and its width along the x direction of the system. A stepper motor enables the mirror stage to be moved in the x direction in a precise manner. The mirror stage can be translated (moved) a total of 150 mm, with an accuracy of positioning the stage within 23 microns of a desired position. The mirror stage has a tray which is located above a bridge or base plate. Between the tray and the base plate are two vertical lifting stages and legs with bearings. The vertical lifting stages are located on the extremities of the mirror stage, separated along the z direction. When one vertical lifting stage raises one end of the tray of the mirror stage higher than the other end, it causes a rotation in the z-y plane (φ (phi) rotation). The arc has an autocollimator assembly at its apex. The autocollimator assembly is used in alignment of the system to verify the angle (specifically the φ rotation) of the sample. The vertical lifting stages have a complete range of 16 mm and an accuracy of positioning an end of the mirror stage tray of 0.5 microns. These performance abilities for the vertical lifting stages correspond to an angular accuracy of 0.6 micro radians (μrad) and a complete range of 1.09 degrees in φ rotation.

The x-ray source assembly includes an x-ray source configured to generate a beam that is aligned in the system by tilting the source within the source assembly, focusing the beam, utilizing slits, and in some cases utilizing a monochromator assembly (e.g., the monochromator assembly 240). The slits in the x-ray source are controlled by separate actuators, so that the openings created by each slit can be independently set. This is also true for the slits in the detector assembly. Each slit of the pair of slits in the detector assembly has dedicated actuators to control the slit opening size. The precision of the actuators allows for the opening of the slits to be controlled to within 20 microns (0.02 mm).

In use, the x-ray source is powered up and an x-ray beam leaves the source. The beam is focused and refined by altering the position of the source, utilizing components such as the focus mirror, slits, and in some cases by using the monochromator assembly. The x-ray beam then impinges on the sample surface, in this exemplar case the adaptive mirror surface. Following interaction of the x-ray beam with the sample surface, x-rays reflect off the sample surface and arrive at an x-ray detector of the x-ray detector assembly, which records the intensity of the reflected x-ray beam. The high-resolution x-ray reflectometer correlates the angle θ of the source and the detector assemblies with the recorded intensity to obtain a graph of intensity versus incident angle. There will be a periodic nature to the curve of this graph, and from that materials properties of the sample surface may be derived.

In use, an operator may review the data obtained by the x-ray reflectometry system. In order to optimize the alignment of the system, the operator may, based on data from the autocollimator mounted on the arc of the system, adjust the height of the first vertical lifting stage and/or adjust the height of the second vertical lifting stage, either manually or using a computing unit of the x-ray reflectometry system. The operator may further cause the system to insert or remove the monochromator assembly into the x-ray beam path, as well as adjusting the position or size of any opening of one or more slits along the x-ray beam path. Though not illustrated, the system may include one or more computing units with at least one processor executing instructions operate one or more components of the system including any of the x-ray source assembly, the autocollimator, the detector assembly, the movement in the z direction of the arc, the height and/or tilt of the sample stage, and the movement in the x direction of the sample stage.

The high-resolution x-ray reflectometer can be part of a reflectometry system that includes one or more computing units. Each computing unit has one or more processor and non-volatile memory for storing instructions which control the actions or motions of one or more components of the reflectometry system. One computing unit may include a user interface configured to receive instructions from a user, as well as to display data and options for the user in response to the data.

A computing unit may collect data from a 2D angle detector (e.g., autocollimator) and direct movement of the sample stage until a pre-determined value for φ is detected. The stage movement that can be controlled by the system includes tilting or raising of the sample stage by alternately raising and lowering the first and/or second vertical lifting stages, moving the sample stage in the x direction, and moving the arc in the z direction. In an exemplary system, a computing unit may include a pseudo-motor that takes input of angle of change for the sample stage and a sample height in the middle of the stage from a user. The computing unit then outputs the required individual heights for the two vertical lifting stages (e.g., z-stages) of the sample stage, in microns, based on the known (fixed) spacing for each stage as actuated movement of the stage.

The system may include a compute unit which controls slit movement in the x-ray source assembly and a compute unit which controls slit movement in the detector assembly until an intensity value which is either preset in the compute unit or input by a user is attained. The compute unit which controls the slit movement in the source assembly may be the same compute unit which controls slit movement in the detector assembly. The compute unit which controls slit movement in the source assembly may also control the insertion and removal of the monochromator from the x-ray beam path.

The rate of motion of the x-ray source assembly and the detector assembly may be controlled by a compute unit to optimize the characteristics of the data collected by the reflectometry system, such as the intensity of the reflected x-ray beam at each angle of attack (e.g., θ location). The reflectometry system may iterate over various positions of the components until reaching a user defined threshold for data points, for example for a number of locations on the sample (e.g., the surface of a mirror) or for a preset range of angles θ.

The resulting data from the automated motion or controlling of components of the reflectometry system may be presented to the user via the user interface so that user defined thresholds or ranges may be updated. Additionally, the resulting data may be saved by a user for further analysis. In some configurations, the reflectometry system may include a computing unit which can analyze the resulting data to determine surface and/or interfacial roughness, film thickness, or materials properties of a sample.

All the ways in which the system can be adjusted, as described above, allow for precise alignment of the system. Precise alignment of the high-resolution x-ray reflectometer allows for collection of data of better resolution, so that small aberrations in the surface of a mirror can be detected. In an exemplary x-ray reflectometry system, multilayer performance optics with shaped surfaces can be accurately characterized with curvature resolution better than 0.002° with an x-ray diffraction angular resolution (θ) of 0.0038° or better, over areas of up to 150 mm×1000 mm.

Though much of the discussion of the high-resolution x-ray reflectometer described herein is with respect to an adaptive mirror as the sample being characterized, other types of samples may be examined. The high-resolution x-ray reflectometer may be used to characterize any type of mirror, including adaptive mirrors, as well as samples made of multiple layers of differing materials including layers of different polymorphs or orientations of a compound, crystal optics, and the like.

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for methods and systems for producing radioisotopes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The following list of aspects reflects a variety of the embodiments explicitly contemplated by the present application. Those of ordinary skill in the art will readily appreciate that the aspects below are neither limiting of the embodiments disclosed herein, nor exhaustive of all the embodiments conceivable from the disclosure above but are instead meant to be exemplary in nature.

1. A high-resolution x-ray reflectometer, comprising: a table; an x-ray source assembly and an x-ray detector assembly mounted on an arc; and a sample stage positioned under the arc on a top surface of the table, wherein: the arc is configured to move relative to the top surface of the table in a first direction; the sample stage is configured to move relative to the top surface of the table in a second direction; the x-ray source assembly and the detector assembly are configured to move in a third direction relative to the sample stage, the third direction being different from the first direction.

2. The high-resolution x-ray reflectometer of aspect 1, wherein the sample stage comprises a tray with a first end and a second end and a first vertical lifting stage configured to move the first end of the tray, wherein the sample stage is configured to accommodate a sample with a thickness of 10 cm or more, and wherein the first end operably attached to the first vertical lifting stage via a first pair of legs, each leg having a first bearing connecting the tray to the leg and a second bearing connecting the leg to a first vertical lifting stage of the sample stage.

3. The high-resolution x-ray reflectometer of aspect 2, wherein the sample stage further comprises a second pair of legs operably attached to the second end of the tray, wherein each leg of the second pair of legs comprises a single bearing connecting the leg to either the tray or a second vertical lifting stage.

4. The high-resolution x-ray reflectometer of aspect 1, wherein the sample stage further comprises a tray having a first end and a second end, a first vertical lifting stage configured to move the first end, and a second vertical lifting stage configured to mover the second end.

5. The high-resolution x-ray reflectometer of aspect 4, wherein the first vertical lifting stage and second vertical lifting stage are independently controllable such that the first and second lifting stages are configured to raise the first and second ends of the tray, respectively, independently.

6. The high-resolution x-ray reflectometer of aspect 4, wherein the sample stage is configured to tilt the tray.

7. The high-resolution x-ray reflectometer of any of aspect 1-6, further comprising an autocollimator mounted on the arc, the autocollimator configured to determine the tilt of a sample on the sample stage.

8. The high-resolution x-ray reflectometer of any of aspect 1-7, wherein the x-ray source assembly comprises an x-ray source, a monochromator, a first slit, and a second slit, the first slit being positioned between an x-ray source within the x-ray source assembly and the monochromator and the second slit being positioned on the other side of the monochromator.

9. The high-resolution x-ray reflectometer of aspect 8, wherein the first slit and the second slit each have openings which are controlled by dedicated actuators such that the first slit and the second slit are independently controllable.

10. A sample stage for a high-resolution x-ray reflectometer, comprising: a tray with a first end and a second end; a first vertical lifting stage; a second vertical lifting stage; a first pair of legs operably attached to the first end of the tray and the first vertical lifting stage, such that the first vertical lifting stage is configured to move the first end of the tray; and a second pair of legs operably attached to the second end of the tray and the second vertical lifting stage, such that the second vertical lifting stage is configured to move the second end of the tray; wherein each leg of the first pair of legs has a first bearing connecting the tray to the leg and a second bearing connecting the leg to the first vertical lifting stage of the sample stage, wherein the sample stage is configured to accommodate a sample with a thickness of 10 cm or more.

11. The sample stage of aspect 10, wherein each leg of the second pair of legs comprises a single bearing connecting the leg to either the tray or the second vertical lifting stage.

12. The sample stage of any of aspects 10-11, wherein the first vertical lifting stage and second vertical lifting stage are configured to raise the first and second end of the tray independently.

13. The sample stage of aspect 12, wherein the sample stage is configured to tilt the tray.

14. A high-resolution x-ray reflectometry system comprising one or more processors and a non-volatile computer readable medium storing instructions, the instructions when executed by the one or more processors, causing the system to: produce an x-ray beam using an x-ray source assembly; impinge the x-ray beam onto the sample; tilt a sample on a sample stage until the x-ray beam reflects, the sample stage comprising: a tray with a first end and a second end; a first and a second vertical lifting stage; a first pair of legs operably attached to the first end of the tray and the first vertical lifting stage; and a second pair of legs operably attached to the second end of the tray and the second vertical lifting stage; receive, by a detector assembly, the reflected x-ray beam; and optimize the tilt of the stage based on data obtained by an autocollimator of the x-ray reflectometry system.

15. The high-resolution x-ray reflectometry system of aspect 14, wherein the instructions further cause the system to accept instructions from an operator, the instructions from the operator comprising any of: an adjustment of a height of the first vertical lifting stage based on data obtained by the autocollimator; an adjustment of a height of the second vertical lifting stage based on data obtained by the autocollimator; insertion of a monochromator into the x-ray beam path as it leaves the x-ray source; removal of the monochromator from the x-ray beam path from the x-ray source; and an adjustment to a position or size of one or more slits along the x-ray beam path.

16. The high-resolution x-ray reflectometry system of aspect 15, wherein the instructions further cause the system to display data to the operator.

17. The high-resolution x-ray reflectometry system of any of aspects 14-16, wherein the instructions cause the system to translate arc of the reflectometry system in a z direction of the system.

18. The high-resolution x-ray reflectometry system of any of aspects 14-17, wherein the instructions further cause the system to translate the sample stage in an x direction of the system.

19. The high-resolution x-ray reflectometry system of any of aspects 14-18, wherein the instructions further cause the system to adjust of a rate of movement of the x-ray source assembly and of the detector assembly.

20. The high-resolution x-ray reflectometry system of any of aspects 14-19, wherein the autocollimator is an electronic autocollimator.

What is claimed is:

1. A high-resolution x-ray reflectometer, comprising:
a table;
an arc;
an x-ray source assembly and an x-ray detector assembly mounted on the arc; and
a sample stage positioned under the arc on a top surface of the table,
wherein:
the arc has a base that is coupled to the table and movable relative to the top surface of the table in a first direction;
the sample stage is configured to move relative to the top surface of the table in a second direction, the second direction being different from the first direction; and
the x-ray source assembly and the detector assembly are configured to move in a third direction relative to the sample stage, the third direction being different from the first direction.

2. The high-resolution x-ray reflectometer of claim 1, wherein the sample stage comprises a tray with a first end and a second end and a first vertical lifting stage configured to move the first end of the tray, wherein the tray is configured to accommodate a sample with a thickness of 10 cm or more, and wherein the first end is operably attached to the first vertical lifting stage via a first pair of legs, each leg having a first bearing connecting the tray to the leg and a second bearing connecting the leg to the first vertical lifting stage.

3. The high-resolution x-ray reflectometer of claim 2, wherein the sample stage further comprises a second vertical lifting stage configured to move the second end of the tray, and wherein the second end is operably attached to the second vertical lifting stage via a second pair of legs, wherein each leg of the second pair of legs comprises a single bearing connecting the leg to either the tray or the second vertical lifting stage.

4. The high-resolution x-ray reflectometer of claim 1, wherein the sample stage further comprises a tray having a first end and a second end, a first vertical lifting stage configured to move the first end, and a second vertical lifting stage configured to move the second end.

5. The high-resolution x-ray reflectometer of claim 4, wherein the first vertical lifting stage and second vertical lifting stage are independently controllable such that the first and second vertical lifting stages are configured to raise the first and second ends of the tray, respectively, independently.

6. The high-resolution x-ray reflectometer of claim 4, wherein the sample stage is configured to tilt the tray.

7. The high-resolution x-ray reflectometer of claim 6, further comprising an autocollimator mounted on the arc, the autocollimator configured to determine the tilt of a sample on the sample stage.

8. The high-resolution x-ray reflectometer of claim 1, wherein the x-ray source assembly comprises an x-ray source, a monochromator, a first slit, and a second slit, the first slit being positioned between the x-ray source within the x-ray source assembly and a first side of the monochromator and the second slit being positioned on a second side of the monochromator.

9. The high-resolution x-ray reflectometer of claim 8, wherein the first slit and the second slit each have openings which are controlled by dedicated actuators such that the first slit and the second slit are independently controllable.

10. The high-resolution x-ray reflectometer of claim 1, the sample stage comprising:
a tray with a first end and a second end;
a first vertical lifting stage;
a second vertical lifting stage;

a first pair of legs operably attaching the first end of the tray and the first vertical lifting stage, such that the first vertical lifting stage is configured to move the first end of the tray; and a second pair of legs operably attaching to the second end of the tray and the second vertical lifting stage, such that the second vertical lifting stage is configured to move the second end of the tray;

wherein each leg of the first pair of legs has a first bearing connecting the tray to the leg and a second bearing connecting the leg to the first vertical lifting stage of the sample stage, and wherein the sample stage is configured to accommodate a sample with a thickness of 10 cm or more.

11. The high-resolution x-ray reflectometer of claim 10, wherein each of leg of the second pair of legs comprises a single bearing connecting the leg to either the tray or the second vertical lifting stage.

12. The high-resolution x-ray reflectometer of claim 7, wherein the autocollimator is an electronic autocollimator.

13. The high-resolution x-ray reflectometer of claim 1, wherein the base of the arc is slidable along the top surface of the table via rails positioned along the top surface.

\* \* \* \* \*